United States Patent [19]
Kligman

[11] 3,867,522
[45] Feb. 18, 1975

[54] ACNE COMPOSITION

[75] Inventor: Albert M. Kligman, Philadelphia, Pa.

[73] Assignee: Westwood Pharmaceuticals, Inc., Buffalo, N.Y.

[22] Filed: Oct. 11, 1973

[21] Appl. No.: 405,350

Related U.S. Application Data

[63] Continuation-in-part of Ser. No. 197,111, Nov. 9, 1971, abandoned.

[52] U.S. Cl. ................................................ 424/153
[51] Int. Cl. ............................................ A61u 27/00
[58] Field of Search ......... 52/197; 424/153, 69, 357

[56] References Cited
UNITED STATES PATENTS
3,574,854  4/1971  Bossaed .............................. 424/357

Primary Examiner—Stanley J. Friedman
Attorney, Agent, or Firm—James Magee, Jr.

[57] ABSTRACT

A composition and method for the treatment of acne has been found which comprises the incorporation of sodium chloride crystals in concentrations of 30–60 percent in a carrier base, said composition being used to debride acne affected skin by abrasion.

3 Claims, No Drawings

ACNE COMPOSITION

CROSS REFERENCE TO RELATED APPLICATIONS

This application is a continuation-in-part of application Ser. No. 197,111, filed Nov. 9, 1971, now abandoned.

BACKGROUND OF THE INVENTION

1. Field of the Invention

This invention is directed to compositions for the treatment of acne and to methods for the treatment of acne using the disclosed compositions.

2. Description of the Prior Art

A. U.S. Pat. No. 3,574,854 describes the application of a composition containing a solution of 10 to 15 percent sodium chloride (or "salt") in a soothing base for the purpose of soothing the skin.

B. F. M. Crittenden, Jr., Cutis 7, No. 3, pp. 295–300 (March 1971) reports the removal of tattoos by superficially abrading the skin with moistened table salt until the skin is a uniform red color characterized by serous oozing which turns into a crusty scab. Other references to the technique of skin abrading with the use of salt for this purpose are cited therein.

Summary of the Invention

The present invention relates to compositions and methods for treating acne in which a composition comprising sodium chloride crystals in 30 to 60 percent concentration are incorporated into a suitable vehicle or base which acts as a carrier. The composition is applied to the affected skin in such a manner as to debride the lesions and comedos which are characteristic of acne.

Complete Disclosure

Acne is a dermatological disorder which is prevalent in adolescence and has been viewed as a normal physiologic reaction in the skin. The increase in size of the sebaceous glands and the concomitant increased amount of sebum during adolescence are clearly physiologic, but the inflammatory changes of true acne represent a disease which may be extraordinarily chronic and is frequently the cause of severe residual scarring. The various clinical manifestations of acne range from mild to severe, noninflammatory to grossly infected, and of minimal to wide extent.

Histologic study of the acne lesion reveals the primary lesion to be a comedo, i.e., an abnormal mass of keratin and sebum within a dilated follicular orifice. Eventually the comedo enlarges to the point where simple mechanical and chemical forces rupture the follicular epidermal wall, allowing the keratin and sebum to enter the corium as a foreign body. This results in a folliculitis of varying severity. It may range from a tender erythematous area to a frankly purulent papulopustular lesion. At times secondary bacterial growth occurs in the comedo itself, and follicular rupture may allow bacteria to move into the dermis, creating an even more marked inflammatory change. It can be seen that a blend of foreign body reaction and bacterial infection, all secondary to follicular rupture, explains much if not all of the clinical changes in acne.

About 85–95 percent of both sexes show some evidence of acne at the age of puberty. There is no significant sex difference in incidence or severity. In some patients, comedones may begin to develop at the age of nine or ten. The evidence of acne may persist for a variable period of time, probably never less than a year, but sometimes spanning the entire "teen-age," with occasional extension well into the twenties. In general, the more severe the acne, in terms of both the individual lesions and the extent of their distribution, the longer its course. The localization is capricious, though it is usually bilateral and symmetric and always in areas with the highest concentration of sebaceous glands.

The fundamental pathologic change in acne is a closure of the follicular canal by a mixture of introfollicular scales (keratin) and some sebum. This is clearly seen as a comedo or blackhead. The blackness of the top of the comedo is due to a chemical change in the keratinous debris and is not adherent or embedded dirt, as is often assumed. The color is due to melanin.

In general, the usual treatment of acne vulgaris is unsatisfactory. Although the hormonal stimulus is basic to the development of the disease, there are not effective means of combatting it from a fundamental etiologic standpoint. The therapeutic attack must be on the fringes, (a.) through local therapy which may help in relieving the plugging and rupture of the follicular orifice, (b.) through control of contributing factors such as foods or drugs, which may variously "trigger" the inflammatory changes, (c.) through judicious drainage of purulent lesions by means which are least likely to produce scarring, (d.) through methods of combatting infection with appropriate antibacterial measures, and (e.) through taking advantage of natural aids, such as sunlight, as fully as possible. None of these measures is curative in the strict sense. All are palliative; they serve only to keep the acne under control, prevent undue scarring, and reduce psychic trauma until the hormonal and emotional factors have subsided.

Topical therapy, which is often relatively ineffective, apparently acts principally by causing varying degrees of exfoliation. Local treatment will be found most effective when there is considerable surface oiliness and in the presence of very superficial pustular lesions and comedones which can be removed easily.

It is generally an accepted technique in the treatment of acne to artificially promote topical irritation of the skin in order to induce the sloughing off of old skin and the growth of new. In acne, the localized inflammation and sloughing of the skin has the beneficial effect of removing the horny keratinous plugs, more properly known as comedones, from within a dilated follicular orifice. In lay terms, the exfoliation (peeling) of the skin keeps the pores of the skin open and prevents them from becoming blocked with "blackheads," other normal secretions of the skin such as sebum, or keratin. By keeping the follicular pores open and draining properly, one decreases the possibility of the development of frankly purulent papulopustular lesions.

An object of the present invention is to provide a superior and efficacious composition for topical treatment of acne. A further object of the invention is to provide a method for removing lesions and comedones associated with acne.

These and other related objectives are achieved by a method of treatment in which the acne affected skin is debrided by abrasion achieved by vigorously rubbing the skin with crystals of sodium chloride carried or suspended in some suitable ointment or lotion base. The friction caused by rubbing in of the crystals causes a mild irritation of the skin and some exfoliation. This treatment has been found to remove the comedones and leave the pores free of keratinous matter.

The compositions are applied to areas of the skin affected with acne. Following application, the composition is vigorously rubbed, preferably by the fingers, on the surface of the skin for a period of one to two minutes. The product may be applied with a gauze pad and the like. At the conclusion of the application, the skin may be washed with water and dried. Alternatively, the product may be left on the skin or be wiped off. The treatment is repeated at least twice daily until a noticeable improvement is observed.

It has now been shown that it is possible to control the physical manifestation of acne vulgaris and to clear the skin of comedones by the application to the skin of the composition of the present invention. Characteristically, the frictional application of the preparation debrides the outer layers of the skin and produces a mild inflammation of the area to which it is applied. Such application is continued until physical improvement is achieved, i.e., until the acne is no longer apparent. Maintenance treatments can then be continued less frequently in order to maintain the unblocked pores of the skin. Since in the treatment of acne it is desirable to lessen the oily texture of the skin, it is generally preferred that any medication be formulated in a greaseless vehicle, e.g., aqueous, hydro-alcoholic, alcoholic, etc.

While debridement of the comedones can be achieved by rubbing with salt moistened with water, it is generally preferred to incorporate the sodium chloride crystals into a vehicle or base which will facilitate the treatment. Since excessive skin oiliness is often associated with acne, the general approach to the treatment of acne tends away from the use of oily or fatty materials. Although such materials are indeed suitable for use as a vehicle for the salt crystal composition of this invention, secondary considerations suggest the use of washable ingredients or lotions as a vehicle. Such base compositions are well-known to those in the cosmetic and dermatology arts and are disclosed in regonized texts such as: *New Unguent Bases and Lotions* by I. K. Hoffman, Chemical Publishing Co., Inc., New York, New York, 1957; *Cosmetics and the Skin* by Wells and Lubowe, Reinhold Publishing Co., 1964. The addition of emulsifiers, suspending agents, humectants, skin conditioners, emollients, preservatives and other similar adjuvants is compatible with the invention and can be used to control and determine the consistency of the final product.

Oil in water emulsions as hydrophilic ointments and vanishing creams type bases are particularly compatible with highly ionic formulations.

The sodium chloride crystals which are the essential elements of the treatment composition and method can be provided as ordinary table salt or any other equivalent form of sodium chloride. In general, it is only necessary that the salt be sufficiently coarse to provide adequate grit to debride. Particle size in the range of from about 200 to 500 microns has been found convenient from the point of view of case in working, formulating and compounding and also effective with respect to efficient debridement without undue damage to unaffected tissue surrounding the acne. Narrower ranges running from about 200 to 400 microns and 45 to 55 percent are also suitable.

The sodium chloride composition employed in this method of treatment is characterized by a significant content of discrete crystals to the extent that the composition has a rough and somewhat gritty feel and is capable of debridement by means of abrasion. It is this abrasive nature which provides the exfoliation and debridement. The abrasion and the salinity in general provide a cleansing and refreshing effect.

The actual amount of sodium chloride and the particle size thereof is not narrowly critical. It is essential that there be sufficient grit to abrade the skin. In general, a particle size of from about 200 to 500 microns is suitable and amounts of from about 50 to 60 percent by weight of the crystals have been found satisfactory.

The consistency and comestic acceptability of the composition can be significantly influenced by the inclusion of such adjuvents as are generally described above. Humectants and skin conditioners include polyethylene glycols, propylene glycol, glycerin, ethyl alcohol, isopropyl alcohol, acetone and the like. The amounts of these ingredients does not directly influence the debridement function but does depend on and effects the consistency of the resulting lotion, cream, or ointment.

Other suitable ingredients include various derivatives of lanolin and lanolin fractions which function as natural moisturizers, surfactants, emollients, and emulsion stabilizers. Lanolin alcohols, fatty acids, and esters are well-known. Among the sterols present in lanolin are cholesterol, agnosterol, lanosterol, 7-dehydrocholesterol dihydrocholesterol, and cerebrosterol.

The fatty acids and esters are also well-known. All of these lanolin components can be separated, purified, and chemically processed to provide materials which are useful in the formulation of a vehicle suitable for this invention. In general acetylation, ethoxylation, and esterification with acids such as ricinoleic, are the most usual.

Examples 1 and 2 illustrate suitable vehicles for use in the preparation of the composition of this invention.

Example 1

| Composition Base: | |
|---|---|
| Glyceryl Monostearate (pure) | 5.0 gm. |
| Triple Pressed Stearic Acid | 17.0 gm. |
| Solulan 98 — (American Cholesterol Corp.) | 3.0 gm. |
| Amerchol L-101 (American Cholesterol Corp.) | 5.0 gm. |
| Propylene Glycol | 5.0 gm. |
| Parahydroxybenzoic Acid Methyl Ester | 0.2 gm. |
| Parahydroxybenzoic Acid Propyl Ester | 0.1 gm. |
| Sodium Lauryl Sulfate | 0.5 gm. |
| Water | 04.20 gm. |

Example 1

| Composition Base: | |
|---|---|
| Glyceryl Monostearate (pure) | 5.0 gm. |
| Triple Pressed Stearic Acid | 17.0 gm. |
| Solulan 98 — (American Cholesterol Corp.) | 3.0 gm. |
| Amerchol L-101 (American Cholesterol Corp.) | 5.0 gm. |
| Propylene Glycol | 5.0 gm. |
| Parahydroxybenzoic Acid Methyl Ester | 0.2 gm. |

Example 1-Continued

Composition Base:

| | |
|---|---|
| Parahydroxybenzoic Acid Propyl Ester | 0.1 gm. |
| Sodium Lauryl Sulfate | 0.5 gm. |
| Water | 04.20 gm. |

Directions: Heat the sodium lauryl sulfate, parahydroxybenzoic acid methyl ester, propylene glycol and water to 160° F. while mixing slowly. Heat the remainder of the ingredients together to 160° C. with mixing and add to the aforementioned hot mixture with stirring. Continue to mix while cooling to room temperature to produce the "composition base."

Example 2

Hydrophilic Ointment Base:

| | |
|---|---|
| Petrolatum | 25% |
| Steryl Alcohol | 25% |
| Propylene Glycol | 15% |
| Sodium Lauryl Sulfate | .50% |
| Water | q.s. |

Example 3

| | |
|---|---|
| Sodium Chloride Crystals (300–400 microns) | 50% |
| Lanolin-derived Sterol Extracts (Amerchol L-101-American Cholesterol Corp.) | 2.5% |
| Glyceryl Monostearate (pure) | 2.5% |
| Triple Pressed Stearic Acid | 8.5% |
| Acetylated Polyoxyethylene Derivative of Lanolin (Solulan 98 — American Cholesterol Corp.) | 1.5% |
| Propylene Glycol | 2.5% |
| Parahydroxybenzoic Acid Methyl Ester | 0.1% |
| Parahydroxybenzoic Acid Propyl Ester | 0.05% |
| Sodium Lauryl Sulfate | 0.25% |
| Water | 32.10% |

Example 3, above describes a formulation comprising about equal parts by weight of sodium chloride and base. The ratio of base to salt can vary over a relatively wide range, limited only by the need for sufficient abrasion for removal of acne.

Amerchol L-101 is an oil soluble liquid, hydrophilic, nonionic surface active penetrant, emollient, and emulsifier containing cholesterol and related sterols and complex alcohols, all of natural lanolin origin, in a liquid medium. It has the following specifications:

| | |
|---|---|
| Appearance | pale yellow, oily liquid |
| Odor | faint, characteristic sterol odor |
| Water soluble acids and alkalies (USP XVI, p. 805) | neutral to litmus |
| Acid no. | 1.0 max. |
| Ash | 0.2% max. |
| Hydroxyl no. | 10–15 |
| Iodine no. | 12 max. |
| Moisture | 0.2% max. |
| Saponification no. | 1.0 max. |
| Specific gravity | 0.840 to 0.860 at 25° C. |
| Viscosity | 20–30 cps. at 25° C. |
| Volatile matter | no distillable matter at 5 mm. up to 150° C. |

Solulan 98 is a polyoxyethylene derivative of lanolin obtained by acetylation after reacting hydrophilic polyoxyethylene chains with lipophilic groups of lanolin origin.

This particular acetylated polyoxyethylene lanolin derivative which is given by way of illustration has the following specifications:

| | |
|---|---|
| Appearance | light amber viscous |
| Odor | faint-pleasant |
| pH of 10% aq. soln. | 5.0–7.5 |
| Acid no. | 3.0 max. |
| Hydroxyl no. | 55–65 |
| Saponification no. | 65–75 |
| Specific gravity | 1.035–1.055 at 25° C. |

Although the composition and method have been described mainly in a washable base such as oil in water emulsions, it is noted that mere water can function as a carrier. For example, the crystals can be carried in a supersaturated solution or the crystals can merely be moistened in order to facilitate workability. Additional simple petroleum jelly can operate as a carrier and if the skin is well washed after use, need not cause any undesirable consequence resulting from the well-known incompatibility of greasy or oily materials and acne.

What is claimed:

1. A method for the treatment of acne-affected skin which comprises applying to the skin a composition consisting essentially of sodium chloride crystals in a base for topical application, followed by frictional rubbing of said composition on the affected skin to cause abrasion and debridement of the skin, said crystals being of a particle size and being present in an amount sufficient to abrade the skin.

2. The method of claim 1, wherein the composition comprises from about 30 to about 60 weight precent of discrete crystals of sodium chloride.

3. The method of claim 1, wherein the crystals of sodium chloride have a particle size of from about 200 to 500 microns.

* * * * *